United States Patent [19]

Kotoyori

[11] 4,179,200

[45] Dec. 18, 1979

[54] SCREEN COATING SYSTEM FOR PANEL OF COLOR PICTURE TUBE

[75] Inventor: Akira Kotoyori, Ichinomiyamachi, Japan

[73] Assignee: Hitachi, Ltd., Japan

[21] Appl. No.: 891,624

[22] Filed: Mar. 30, 1978

[30] Foreign Application Priority Data

Apr. 4, 1977 [JP] Japan ............................ 52-40920[U]

[51] Int. Cl.² ............................................ G03B 41/00

[52] U.S. Cl. ........................................ 354/1; 29/25.1; 198/347

[58] Field of Search ...................... 354/1, 50; 198/347; 427/157, 402, 68; 29/25.1; 313/461; 204/298, 192 R

[56] References Cited

U.S. PATENT DOCUMENTS

| | | | |
|---|---|---|---|
| 2,933,176 | 4/1960 | Mansson | 198/347 X |
| 3,153,487 | 10/1964 | Hoellen | 198/347 X |
| 3,754,632 | 8/1973 | Kreutter | 198/347 |

*Primary Examiner*—Richard A. Wintercorn
*Attorney, Agent, or Firm*—Craig and Antonelli

[57] ABSTRACT

A screen coating system for the panel of a color picture tube including a panel conveying line and pluralities of coating stations and exposing stations arranged along the panel conveying line and capable of automatically coating the panel with given materials and exposing the panel. The coating system further includes a panel storage adjacent to an intermediate portion of the conveying line and a panel transfer device which transfers panels between the panel storage and the conveying line. The panel storage temporarily stores panels having passed through the stations upstream thereof when the stations downstream thereof fail in operation due to a trouble, and supply panels temporarily stored to the stations downstream thereof when the stations upstream thereof fail in operation due to a trouble, thereby enabling increase in the operating efficiency of the system.

5 Claims, 5 Drawing Figures

FIG. 5

| CONDITIONS / DEVICES OR STATIONS | | A | B | C | D | E | F | G |
|---|---|---|---|---|---|---|---|---|
| CLEANING AND PHOTORESIST COATING STATION | 10 | Δ | X | X | O | O | O | O |
| EXPOSING STATION | 20 | O / X | Δ | X | O | O | O | O |
| GRAPHITE COATING STATION | 30 | O / X | O / X | Δ | O | O | O | O |
| MASK INSERTING DEVICE | 83 | X / X | X / X | X | O | O | O | O |
| PANEL TRANSFER DEVICE<br>PANEL STORAGE | 82<br>81 | X / O | X / O | O | O | O | O | O |
| MASK REMOVING DEVICE | 84 | X / O | X / O | O | X | X | X | X |
| EJECTING DEVICE | 80 | X | X | X | O | O | O | O |
| GREEN PHOSPHOR SCREEN COATING STATION | 40 | O | O | O | Δ | X | X | X |
| BLUE PHOSPHOR SCREEN COATING STATION | 50 | O | O | O | O | Δ | X | X |
| RED PHOSPHOR SCREEN COATING STATION | 60 | O | O | O | O | O | Δ | |
| EMULSION FILMING STATION | 70 | O | O | O | O | O | O | Δ |

SCREEN COATING SYSTEM FOR PANEL OF COLOR PICTURE TUBE

BACKGROUND OF THE INVENTION

The present invention relates to a panel coating system wherein the whole process from cleaning to emulsion filming of panels of color pictures tubes is automated.

In general, the manufacturing process of a color picture tube requires a plurality of coating steps for forming a black matrix film, phosphor screen and acryl coat on the inner surface of the panel and a plurality of exposing steps for exposing the panels formed with films, with the panels being installed with shadow masks. There has been developed an automatic coating line wherein a plurality of coating stations and a plurality of exposing stations are arranged in a given sequence along a panel conveying line as a system of automating the manufacturing process of color picture tubes. In the automatic coating line described above, in case a trouble is caused to any one of the stations during operation, then either the whole system of the coating line or stations upstream of the station having the trouble should be put out of operation, thereby decreasing the operating efficiency of the coating line. In addition, if either part or the whole of the coating line fails in operation, then the film quality of the panels on the line which failed will be deteriorated, and moreover failure in forming of normal films will be resulted. Furthermore, in the automatic coating line described, such a long period of time as scores of minutes is required for a process from supplying a panel to the starting point of the conveying line to arrival of the panel to the end of the conveying line after passing through stations, and hence, portions of the line take place, which do not contribute to the production at the times of start and end of operation, thus substantially decreasing the operating efficiency of the system.

SUMMARY OF THE INVENTION

Accordingly, an object of the present invention is to provide a screen coating system for a panel of a color picture tube with high operating efficiency.

Another object of the present invention is to provide a screen coating system for a panel of a color picture tube with the occurrence of defectives being minimized.

A further object of the present invention is to provide a screen coating system for a panel of a color picture tube, capable of stopping the operation of the minimum number of stations and continuing the operation of the remaining stations when a trouble is caused to any one of the stations.

A still further object of the present invention is to provide a screen coating system for a panel of a color picture tube, capable of reducing the time from the start of operation to the full operation of the system and the time from the full operation to the end of operation of the system.

BRIEF EXPLANATION OF THE DRAWINGS

The objects, other objects and advantages of the invention will hereinafter be made evident in conjunction with the following description and accompanying drawings, in which drawings.

FIG. 5 is a chart showing the operating condition of the system shown in FIG. 1.

DETAILED DESCRIPTION OF THE PREFERRED EMBODIMENT

Figure 1:
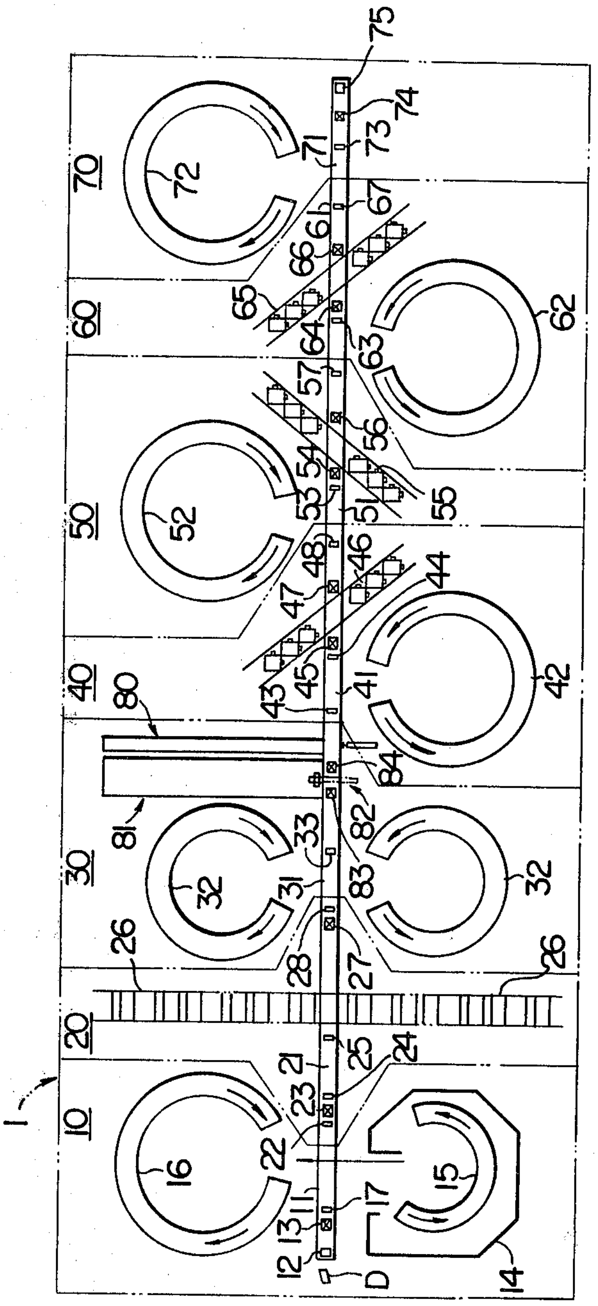
FIG. 1 is a schematic plan view showing one embodiment of the present invention.

FIG. 1 illustrates the screen coating system of the preferred embodiment of the present invention. The coating system has an automatic coating line including a conveying line rectilinearly disposed in the center and seven stations arranged along the conveying line. The seven stations are a cleaning and photoresist coating station 10, an exposing station 20, a graphite coating station 30, a green phosphor screen coating and exposing station 40, a blue phosphor screen coating and exposing station 50, a red phosphor screen coating and exposing station 60, and an emulsion coating station 70. The conveying line is divided into seven sections 11, 21, 31, 41, 51, 61 and 71 corresponding to the seven stations, each comprising a shuttle conveyor which lifts an article, horizontally send same and lower same, thereby forwarding the article by one pitch.

The cleaning and photoresist coating station 10 comprises a cleaning line 15 surrounded by a masking shield 14 and using hydrofluoric acid, a photoresist coating line 16 and a transfer device (not shown) which sends the panel from the conveying line 11 to the cleaning line 15, and to the photoresist coating line 16, and then, returns same to the conveying line 11. The exposing station 20 has an exposing line 26. The graphite coating station 30 comprises a graphite coating line 32 including a photoresist developing line and a transfer device (not shown) for transferring panels from the conveying line 31 to the coating line 32.

The green phosphor screen coating and exposure station 40 comprises a coating line 42 (hereinafter referred to as the "G machine line") for a phosphor screen having a green luminescent color, an exposing line 46 in which a multiplicity of light houses are arranged, and a transferring device (not shown) for transferring panels from the conveying line 41 to the coating line 42.

The blue phosphor screen coating and exposing station 50 comprises a blue phosphor coating line 52 (hereinafter referred to as the "B machine line") including a green phosphor developing line, an exposing line 55 and a transferring device (not shown) for transferring panels from the conveying line 51 to the coating line 52.

The red phosphor screen coating and exposure station 60 comprises a red phosphor screen coating line 62 (hereinafter referred to as the "R machine line") including a blue phosphor developing line, and a transferring device (not shown) for transferring panels between the conveying line 61 and the coating line 62.

The emulsion coating station 70 comprises an emulsion coating line 72 including a red phosphor developing line, and a transferring device (not shown) for transferring panels from the conveying line 71 to the coating line 72.

Figure 2:
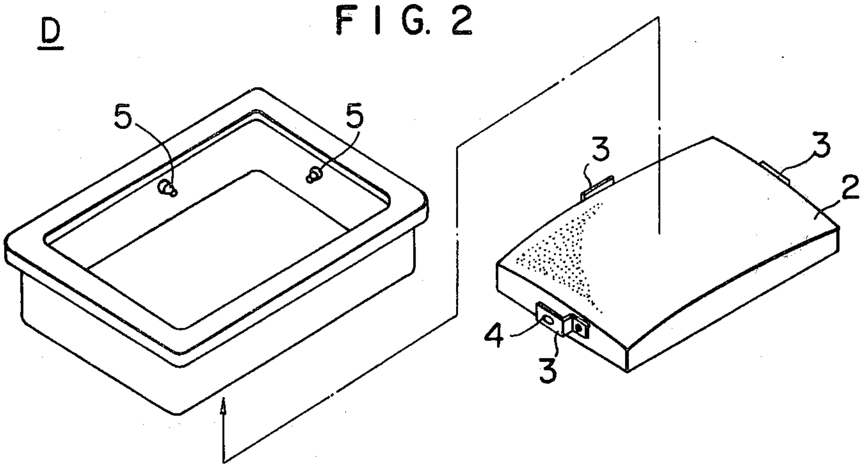
FIG. 2 is an oblique view showing a dummy panel and shadow mask used in the system shown in FIG. 1.

Further, arranged beneath the conveying line are mask removing devices 13, 27, 47, 56 and 66 and mask inserting devices 23, 45, 54, 64 and 74. Each of the mask removing devices coacts with a shuttle conveyer to remove a shadow mask from a panel placed on the removing device by the shuttle conveyor and then insert the shadow mask into a dummy panel placed on the removing device, following to the panel. The dummy panel D is made of an aluminum alloy or the like and formed into a generally hollow square tube as shown in FIG. 2 for example. Correctly positioned and fixed on the inner surface of the dummy panel are mounting pins 5 which are adapted to insert into holes 4 formed on leaf springs 3 installed on the side surfaces of the shadow mask 2 for holding the mask within the dummy panel. The dummy panel D is used for protecting the shadow mask 2 which is very easily damaged by the external force. Each of the mask inserting devices coacts with a shuttle conveyor to remove a shadow mask from a dummy panel placed thereon by the shuttle conveyor and to insert the shadow mask into a panel placed thereon, following to the dummy panel.

Provided above the conveyor line are three-dimensional conveyors (not shown) for lifting panels or dummy panels from the shuttle conveyors and returning same onto the shuttle conveyor after predetermined times. In the drawing, designated at reference numerals 17, 24, 28, 43, 48, 57 and 67 are the points where the articles are lifted from the shuttle conveyors by the three-dimensional conveyors, and reference numerals 22, 25, 33, 44, 53, 63 and 73 are the points at which the articles held by the three-dimensional conveyors are placed onto the shuttle conveyors.

Since the automatic coating line including only the above-mentioned components is of the prior art, detailed description of construction thereof will be omitted, and only action thereof will hereunder be described.

First, a panel holding therein a shadow mask is supplied to a position 12 at the left end of the conveying line 11. After the panel is forwarded one pitch to the right on the conveying line 11, an empty dummy panel D is supplied to the position 12. Next, a panel is supplied again. Likewise, the panels and shadow masks are alternately supplied to the left end 12 of the conveying line.

The panel holding the shadow mask is forwarded by the conveying line 11 to the mask removing device 13 and stopped thereon. The mask removing device 13 positioned below the conveying line 11 withdraws the shadow mask from the panel placed on the removing device 13, downwardly. The panel from which the shadow mask is removed is forwarded into the cleaning line 15 surrounded by the masking shield 14 and is cleaned by using hydrofluoric acid. The panel having been cleaned is sent to the photoresist coating line 16 and subjected to photoresist coating. The panel having been, photoresist-coated is returned onto the conveying line 11.

On the other hand, the dummy panel following to the panel is placed on the mask removing device 13 by the shuttle conveyor. Then, the shadow mask removed from the panel is inserted from below into the dummy panel, by the mask removing device, as indicated by an arrow in FIG. 2. The dummy panel holding the shadow mask is forwarded to the point 17 on the conveying line 11 and then caught by the three-dimensional conveyor or tray conveyor which carries the dummy panel upwardly of the conveying line 11 and after a predetermined time, placed the dummy panel on the conveying line 11 at the point 22. The predetermined time is selected such that when the dummy panel is placed on the point 22 of the conveying line 11, the associated panel has arrived at a point on the conveying line 11, adjacent to the point 22 upstream. This adjustment of the predetermined time is effected by the adjustment of the length of the three-dimensional conveyor and the speed of travel. The dummy panel placed on point 22 of the conveying line 21 is forwarded and placed on the mask inserting device 23, which removes the shadow mask downwardly from the dummy panel. Thereafter, the dummy panel having the shadow mask removed is forwarded on the conveying line 21, rightwards in FIG. 1, while the associated panel is placed on the mask inserting device 23 which inserts the shadow mask into the panel from below to mount the shadow mask within the panel.

The panels in which the shadow masks are mounted by the mask inserting device 23 are transferred to a three-dimensional conveyor which takes up the panels at the point 24, carries them for a predetermined time and places them on the conveying line 21 at the point 25. Thereafter, the panels are supplied to the exposure lines 26, 26 arranged perpendicularly to the conveying line 21, and exposed. Upon being exposed, the panels are returned onto the conveying line 21, the shadow masks are removed from the panels by the mask removing device 27, and the shadow masks are mounted in the dummy panels succeedingly supplied.

The panels from which the shadow masks are removed are supplied to the graphite coating line 32 including the photoresist developing line as a part thereof, and subjected to photoresist developing and graphite coating.

On the other hand, the dummy panels holding the shadow masks pass through a three-dimensional conveyor which takes them up at the point 28 and places them onto the conveying line 31 at the point 33. Additionally, the panel having been graphite-coated is returned to the conveying line 31. When the panel is thus returned, the timing is set such that the panel is placed upstream and adjacent to the dummy panel which carries the shadow mask associated to the panel. The dummy panel and the succeeding panel are conveyed by the conveying lines 31 and 41.

The panel having been conveyed on the conveying line 41 is transferred to the G machine line 42, coated with a green phosphor, and thereafter, returned to the conveying line 41.

Meanwhile, the dummy panel carrying the shadow mask is conveyed by a three-dimensional conveyor extending from the lifting point 43 to the lowering point 44, placed on the mask inserting device 45, and has the shadow mask removed therefrom. Then, the shadow mask is inserted into the panel which has passed through the G machine line 42, and been placed on the mask inserting device 45.

The panel mounting therein the shadow mask is fed onto the exposing line 46 in which a multiplicity of light houses are arranged, and subjected to exposing. After the exposure of the green phosphor screen is over, the panel is forwarded onto the mask removing device 47, which, in turn removes the shadow mask from the panel and inserts the shadow mask into the dummy panel succeedingly supplied.

The panel is transferred to the B machine line 52, and developing and blue phosphor screen coating are performed. Meanwhile, the dummy panel housing the shadow mask is carried by a three-dimensional line extending from the lifting point 48 to the lowering point 53.

The panel having been blue phosphor screen-coated is installed with the shadow mask removed from the dummy panel by the mask inserting device 54, transferred to an exposing line 55 and subjected to exposure. The panel having been exposed is returned to the conveying line 51, has the shadow mask removed therefrom by the mask removing device 56, and the shadow mask is installed in the dummy panel succeedingly supplied.

Next, the panel having been exposed is transferred to the R machine line 62, subjected to developing and coating and is returned to the conveying line 61. Meanwhile, the dummy panel holding the shadow mask is carried by a three-dimensional conveyor extending from the lifting point 57 to the lowering point 63. Then, the panel leaving the R machine line 62 is installed with the shadow mask removed from the dummy panel by the mask inserting device 64, and transferred to the exposing line 65. The panel having been exposed has the shadow mask removed therefrom by the mask removing device 66, and the shadow mask thus removed is installed in the dummy panel suceedingly supplied.

Thereafter, the panel is transferred to the emulsion filming line 72 including a red phosphor developing line, and subjected to developing and emulsion filming. Meanwhile, the dummy panel housing the shadow mask is carried by a three-dimensional conveyor extending from the lifting point 67 to the lowering point 73.

Then, the panel having been developed and emulsion-coated is returned to the conveying line 71 disposed at the center, installed with the shadow mask removed from the dummy panel by the mask inserting device 74, reaches the terminal point 75, and transferred to the succeeding step by conveying means not shown.

All of the above operations are automatically performed by control device not shown. However, as aforesaid, the automatic coating line of the type described, in case a trouble hampering the operation is caused due to any one of the stations, the station having the trouble and the conveying lines and stations upstream thereof should be put out of operation, thereby decreasing the operating efficiency.

Figure 3:
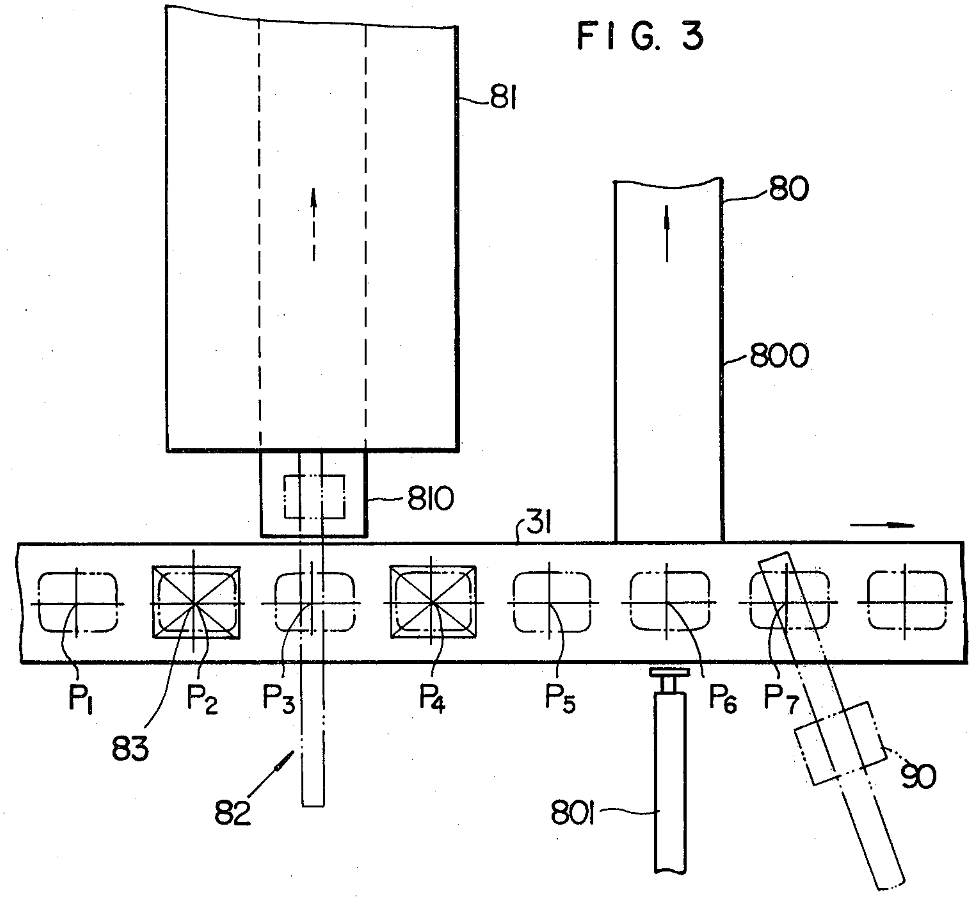
FIG. 3 is an enlarged view showing the vicinity of the panel storage 81 shown in FIG. 1.

Now, in the preferred embodiment of the present invention, an ejecting device 80, a panel storage 81 and a panel transfer device 82 are provided adjacent to the conveying line 31 downstream of the graphite coating line 32. Furthermore, the mask inserting device 83 and mask removing device 84 are provided below the conveying line 31. FIG. 3 illustrates the positional relationship of the above devices. The panels and dummy panels are being forwarded by one pitch on the conveying line 31. Designated at $P_1$ through $P_7$ are the positions at which the panels and dummy panels are stopped at this time. Aligned with the position $P_7$ is a transferring device 90 for transferring the panel from the conveying line to the G machine line 42, by which the panel at the position $P_7$ is transferred to the G machine line 42. Aligned with the position $P_6$ adjacent to the position $P_7$ is the ejecting device 80 comprising a horizontal conveyor 800, and a push-out member 801 actuated by a pneumatic cylinder for pushing out the panel or dummy panel from the position $P_6$ of the conveying line onto the conveyor 800. As the conveyor 800 and push-out member 801, well known ones suitable for the purposes are usable.

Figure 4:
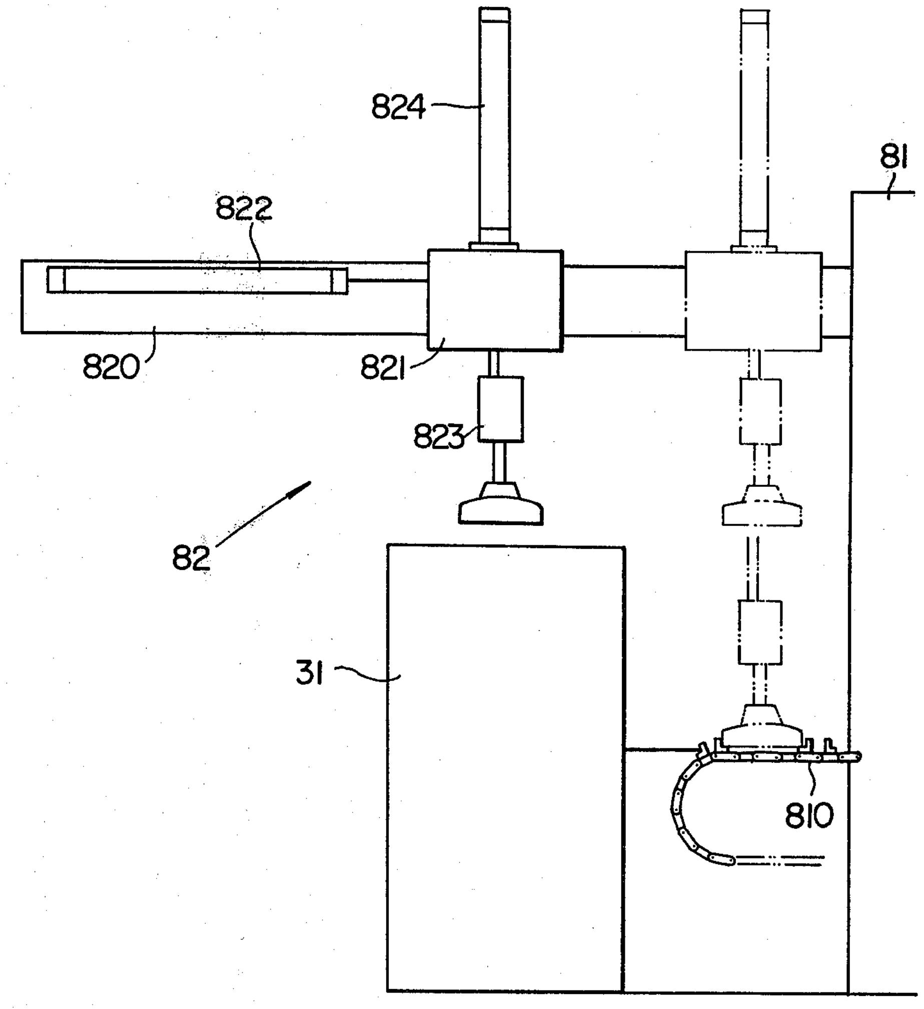
FIG. 4 is a side view showing the panel transfer device.

The panel storage 81 and panel transfer device 82 are aligned with the position $P_3$ disposed upstream of the position $P_6$. As shown in FIG. 4, the panel transfer device 82 comprises a rail 820 horizontally disposed above the conveying line 31, a slider 821 slidable on the rail 820, an air cylinder 822 for horizontally moving the slider 821, a panel holding head 823 vertically, movably held by the slider 821, and an air cylinder 824 for vertically moving the holding head 823, and can transfer panels on the shuttle conveyor 31 onto a storage conveyor 810 as shown, and vice versa. The panel storage 81 has the storage conveyor 810, and stores the panels as mounted on the conveyor 810. In order to increase the number of panels in storage, it is desirable that a plurality of storage conveyors are provided in multistage arrangement. It should be understood that the storage 81 and the panel transfer device 82 are not limited to ones shown in the drawing and may be suitably modified.

The mask inserting device 83 is disposed at the position $P_2$ upstream of the position $P_3$, and the mask removing device 84 is disposed at the position $P_4$ downstream of the position $P_3$. The mask inserting device 83 is adapted to remove a shadow mask held within a dummy panel therefrom, and then, to insert the shadow mask into a panel, and one described in U.S. patent Ser. No. 787,842 is preferable.

On the other hand, the mask removing device 84 is adapted to remove a shadow mask held within a panel and install the shadow mask into a dummy panel, and one described in U.S. patent Ser. No. 819,619 is preferable.

Description will hereunder be given of operation. When the whole system of the automatic coating line is in normal operation, the ejecting device 80, panel storage 81, panel transfer device 82, mask inserting device 83 and mask removing device 84 are all maintained out of operation. Now, assumption is made that the station 40 stops its operation due to a trouble. Once the station 40 is stopped in operation, the ejecting device 80, panel storage 81, panel transfer device 82 and mask inserting device 83 begin to operate immediately. Namely, the mask inserting device 83 removes a shadow mask held in a dummy panel sent to the position $P_2$, and inserts the shadow mask into a panel succeedingly supplied. The panel having the shadow mask inserted therein is sent from the position $P_2$ to the position $P_3$, and then, placed on one end of the storage conveyor 810 of the panel storage 81 by the panel transfer device 82. Upon receiving the panel, the storage conveyor 810 is moved by one pitch and ready for the succeeding panel. On the other hand, the push-out unit 801 of the ejecting device 80 sends out onto the conveyor 800 the panels and the dummy panels successively supplied to the position $P_6$. Consequently, neither a panel nor a dummy panel is sent to the station 40. The panels and dummy panels thus sent out are stored on the horizontal conveyor 800 or in a suitable position. Thus, even if the station 40 fails in operation due to a trouble, the stations 10, 20 and 30 upstream of the station 40 can continue the operation, and the panels processed by the stations 10, 20 and 30 are stored as installed with the shadow masks on the storage conveyor 810 of the panel storage 81.

In case any one station disposed downstream of the station 40 has a trouble, only stations from the station 40 through the station having the trouble are put out of operation. In this case, the stations 10, 20 and 30 continue the operation, the panels processed have the shadow masks inserted therein as aforesaid, and stored in the panel storage 81.

On the other hand, in case the station 30 disposed upstream of the panel storage 81 fails in operation due to a trouble, the stations 10 and 20 are stopped in operation immediately, and at the same time, the panel storage 81, panel transfer device 82 and mask removing device 84 begin to operate. In this case, the panel transfer device 82 is so actuated as to hold the panel on the storage conveyor 810 and transfer same to the position $P_3$ on the conveying line 31. The panel placed at the position $P_3$ is sent to the position $P_4$, where a shadow mask held in the panel is removed by the mask removing device 84. The panel having the shadow mask removed therefrom is sent to the position $P_7$ on the conveying line 31, and transferred from the position $P_7$ onto the G machine line by transferring means 90. On the other hand, after the panel having the shadow mask removed therefrom is sent from the position $P_4$ to the downstream direction, a dummy panel is manually placed at the position $P_4$, and the shadow mask is inserted into the dummy panel by the mask removing device 84. The dummy panel holding the shadow mask therein is sent to the downstream direction on the conveying line 31. In addition, the dummy panel may be supplied to a suitable position upstream of the position $P_4$ instead of being directly supplied to the position $P_4$. As described above, the panels stored in the panel storage 81 are supplied onto the conveying line 31, so that all of the stations disposed downstream of the panel storage can normally continue the operation.

In case the station 20 fails in operation due to a trouble, the station 10 is put out of operation and the remaining stations continue the operation. In this case, the panel storage 81, panel transfer device 82 and mask removing device are still put out of operation. After the processed panels sent out of the station 30 are forwarded to the station 40, the panels stored in the panel storage 81 are supplied onto the conveyor line 31, whereby the stations downstream of the panel storage continue the operation.

FIG. 5 collectively illustrates the conditions of trouble occurrences and the conditions of operations of the respective stations, in which a mark Δ designates the failure in operation due to troubles or the like, a mark × putting out of operation, and a mark O operation. As apparent from FIG. 5, even if any one station has a trouble, most stations can continue the operation. As the result, it is possible to minimize the decrease in the operating efficiency as the whole system, and further, decrease the number of defectives.

In the case that the failure of a station downstream of the ejecting device 80 can be restored in a short period of time, only the ejecting device 80 may be operated, and all of the panels and dummy panels forwarded on the conveying line 31 are sent out onto the horizontal conveyor 800, so that the upstream stations 10, 20 and 30 can continue the operation.

Description will hereunder be given of action at the end and the start of operation in the automatic coating line. At the end of operation in the coating line, the panels and dummy panels are stopped to be supplied to the end of the conveying line 11. At the same time, the mask inserting device 83, panel transfer device 82, panel storage 81 and ejecting device 80 are operated, so that the graphite coated panels are installed with the shadow masks and stored in the panel storage 81, while the dummy panels are sent out onto the horizontal conveyor 800. At the time when the panels in the coating line are used up, the automatic coating line is stopped in operation. Thus, the time from the stop in supplying the panels and dummy panels to the conveying line 11 to the stop of the line in operation can be reduced, thereby enabling to improve the operating efficiency. On the other hand, at the start of operation, the supply of panels to the end of the conveying line 11 is begun, and at the same time, the graphite-coated panels are supplied from the panel storage 81 onto the conveying line 31. Thus, the panels can be supplied to the whole system in a comparatively short period of time, thus enabling to substantially improve the operating efficiency.

In the above embodiment, the ejecting device 80, panel storage 81 and the like are provided downstream of the graphite coating station 30. This is a preferable position, because the graphite-coated panels are not easily deteriorated in quality, and therefore, it is convenient to store same. However, the ejecting device, panel storage and the like may be provided at other position. But, in the case that the panel storage are provided downstream of the phosphor screen coating stations 40, 50 and 60, the developed and exposed panels are stored for a time, and hence, it is necessary that the storage means is provided thereon with a device capable of maintaining the panels under a given condition of temperature whereby the panels are not deteriorated in quality during storage.

What is claimed is:

1. In a screen coating system for a panel comprising an automatic coating line including conveying line for conveying panels and dummy panels which serve to hold shadow masks and a plurality of panel coating stations and exposing stations provided along said conveying line the improvement comprising:

panel storage means disposed adjacent to the conveying line;

panel transfer means for transferring panels forwarded to a first position on said panel conveying line to said storage means and for conversely transferring panels from said storage means to said first given position; and ejecting means for sending to the outside of said conveying line panels and dummy panels forwarded to a second position downstream of said first position on said conveying line.

2. A system according to claim 1, wherein:

said system includes a graphite coating station and a phosphor screen coating station which are disposed adjacent to each other; and said first and second positions are disposed on the conveying line connecting said graphite coating station to said phosphor screen coating station.

3. A system according to claim 2, further comprising: means disposed upstream of said first position for inserting shadow masks held in dummy panels into panels: and means interposed between said first and second positions for inserting shadow masks held in panels into dummy panels.

4. A system according to claim 3, wherein said storage means includes a storage conveyor.

5. A system according to claim 3, wherein said ejecting means includes: a push-out member for sending out articles disposed at said second position substantially horizontally and substantially perpendicularly to said conveying line; and a horizontal conveyor extending to a position where articles pushed out by said push-out member are received.

* * * * *